Jan. 25, 1966 J. R. ACTON 3,231,664
ELECTRICAL CONNECTIONS TO THIN CONDUCTIVE LAYERS
Filed June 5, 1962
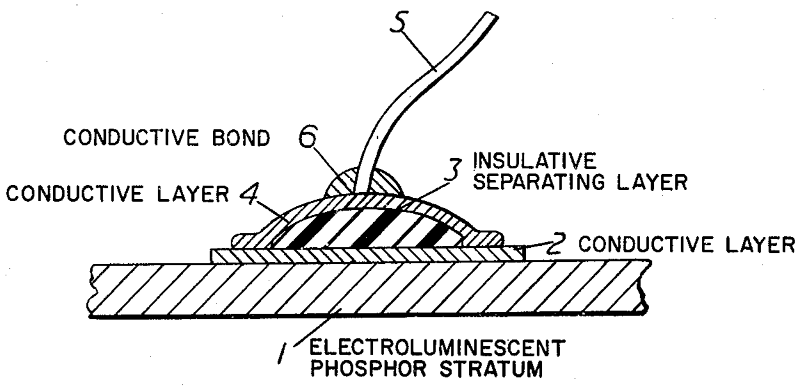
Inventor
JOHN R. ACTON
By
Cameron, Kerkam & Sutton
Attorneys United States Patent Office 3,231,664

Patented Jan. 25, 1966

3,231,664
ELECTRICAL CONNECTIONS TO THIN CONDUCTIVE LAYERS

John Reginald Acton, Kegworth, England, assignor to Ericsson Telephones Limited, London, England, a British company Filed June 5, 1962, Ser. No. 200,249
Claims priority, application Great Britain, July 27, 1961, 27,182/61
5 Claims. (Cl. 174—94)

This invention relates to the making of electrical connections to thin layers of conductive material.

In certain types of electrical apparatus it has become the custom to use conductive material in thin layers. These layers may be formed on a carrier stratum by spraying a surface of the stratum with the conductive material, or by vapour deposition of the conductive material on a surface of the stratum under reduced pressure.

In this specification the adjective "thin" when applied to "layer" or "layers" is to be read as meaning a layer thickness of the order normally obtained by either of the processes mentioned, whether or not the layer referred to was produced by either of these processes. The thickness of such a layer will normally be between 0.01 micron and 25 microns.

Methods of making suitable connections to such thin films are described in my co-pending U.S. applications Nos. 184,117 and 184,499, both of which were filed on April 2, 1962, and particularly their application to electroluminescent panels. It has been noticed however, that when such connections are positioned behind a portion of such a panel viewed by an observer these connections become visible and detract from the appearance of the panel. These electrical connections, made directly to the thin film of an electroluminescent panel become visible, because of the greatly increased thickness of metallic material in the region of the connection and the resultant increase in optical reflectivity of the metallic layer.

According to the invention there is provided an electrical connection between a first thin layer of conductive material and a conductor which connection comprises a relatively massive layer of separating material covering part only of the first thin layer, a second thin layer of conductive material covering part or all of the separating layer and making electrical contact with the first thin layer, and a relatively massive conductive bond adhering to both the second thin layer and the conductor. The term "massive" is to be taken as indicating thicknesses between 100 microns and 5000 microns.

The separating layer must be of a material which prevents the formation of the bond from adversely affecting the properties of the first thin layer.

The invention will now be described with reference to the accompanying drawing. This shows a sectional view of an electrical connection between a conductor and a thin layer of conductive material in the form of a strip. This drawing is not to scale; in particular the thickness of the thin layers has been exaggerated for the sake of clarity.

Referring now to the drawing, a stratum 1 supports a thin layer 2 of conductive material. This layer may conveniently be applied by one of the techniques described above.

In the case of an electroluminescent panel the stratum 1 would be a layer of phosphor carried in an epoxy resin binder and the conductive layer 2 may conveniently be formed from copper, silver, gold or aluminium. Over that part of the layer 2 to which electrical connection is to be made is placed a relatively thick layer 3 of a suitable separating material. The nature of this separating material is such that the formation of the bond between the second thin layer and the conductor does not adversely affect the first thin layer, especially its electrical properties and optical reflectivity. It is also necessary that the separating material shall adhere to the first thin layer. One example of such a material is the epoxy resin adhesive known by the registered trademark "Araldite," which may be used either with or without a filler such as titanium dioxide or barium titanate.

Over this separating layer 3 is applied a thin layer 4 of a conductive material such as silver, gold or copper. This layer is applied in a similar way to the thin layer 2, and must, at least in part, cover the separating layer 3 and the conductive layer 2, making effective electrical contact with the latter. It is preferred that layer 4 should completely cover the separating layer 3. If the separating layer is formed from an initially fluid material it is, of course, necessary to allow this layer to harden completely before applying the layer 4.

A conductor 5 is bonded to layer 4 by means of a bond 6. This bond may conveniently be of the type described in the above-mentioned co-pending applications.

In such a connection, as hereinbefore described, the effect of the massive separating layer is to separate a relatively large thickness of metal in the soldered connection from the thin conductor. This separation serves to substantially reduce the optical reflectivity of the soldered connection without adversely affecting the electrical conductivity of the thin film and the connection itself.

The materials which have been described as suitable for the first and second conductive layers and for the separating layer are, of course, only specific examples of suitable materials.

What I claim is:

1. An electrical connection between a first thin layer of conductive material and a conductor which connection comprises a relatively massive layer of separating material covering part only of the first thin layer, a second thin layer of conductive material covering at least part of the separating layer and making electrical contact with the first thin layer, and a relatively massive conductive bond adhering to both the second thin layer and the conductor.

2. A connection according to claim 1 in which the separating layer is composed of a material such that the formation of the bond between the second thin layer and the conductor does not substantially affect the optical or electrical properties of the first thin layer.

3. A connection according to claim 2 in which the separating layer is composed of an epoxy resin adhesive.

4. A connection according to claim 2 in which the separating layer contains a filler which is either barium titanate or titanium dioxide.

5. A connection according to claim 1 in which the second thin layer contains a metal selected from the group consisting of silver, copper and gold.

References Cited by the Examiner

UNITED STATES PATENTS

| | | | |
|---|---|---|---|
| 2,531,660 | 11/1950 | Ziegler. | |
| 2,836,766 | 5/1958 | Halsted | 313—108 X |

JOHN F. BURNS, *Primary Examiner.*

DARRELL L. CLAY, LARAMIE E. ASKIN, *Examiners.*